(12) United States Patent
Kawakami et al.

(10) Patent No.: US 8,017,870 B2
(45) Date of Patent: Sep. 13, 2011

(54) FASTENING DEVICE FOR A LINE

(75) Inventors: Keiji Kawakami, Kanagawa (JP); Alexander Nickel, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 493 days.

(21) Appl. No.: 12/302,087

(22) PCT Filed: Jul. 13, 2007

(86) PCT No.: PCT/EP2007/057219
§ 371 (c)(1),
(2), (4) Date: Nov. 24, 2008

(87) PCT Pub. No.: WO2008/031655
PCT Pub. Date: Mar. 20, 2008

(65) Prior Publication Data
US 2009/0242235 A1 Oct. 1, 2009

(30) Foreign Application Priority Data

Sep. 12, 2006 (DE) .......................... 10 2006 042 663

(51) Int. Cl.
*H02G 3/00* (2006.01)
(52) U.S. Cl. ................ 174/153 G; 174/152 G; 174/151; 16/2.2; 248/56
(58) Field of Classification Search .............. 174/152 G, 174/153 G, 151; 16/2.1, 2.2; 248/56; 277/606; 439/604
See application file for complete search history.

(56) References Cited

U.S. PATENT DOCUMENTS

| | | | |
|---|---|---|---|
| 6,088,874 A * | 7/2000 | Nakata et al. | 16/2.1 |
| 6,297,449 B1 | 10/2001 | Dagtekin | |
| 6,353,185 B1 | 3/2002 | Sakata | |
| 6,603,078 B2 * | 8/2003 | Okuhara et al. | 174/153 G |
| 6,675,439 B2 * | 1/2004 | Hashimoto | 16/2.1 |
| 6,685,195 B2 * | 2/2004 | Uchida et al. | 277/628 |
| 6,727,432 B2 * | 4/2004 | Sato | 174/663 |
| 6,737,583 B2 * | 5/2004 | Saeki et al. | 174/669 |
| 6,825,416 B2 * | 11/2004 | Okuhara | 174/668 |
| RE38,788 E * | 9/2005 | Satou et al. | 16/2.1 |
| 7,098,402 B2 | 8/2006 | Suzuki | |
| 2001/0020536 A1 | 9/2001 | Kondoh et al. | |

FOREIGN PATENT DOCUMENTS

| | | |
|---|---|---|
| DE | 1 925 877 | 11/1970 |
| DE | 33 40 664 | 5/1985 |
| DE | 43 41 384 | 6/1994 |
| DE | 198 48 651 | 1/2000 |
| DE | 101 01 013 | 3/2002 |
| DE | 102 44 813 | 5/2003 |
| DE | 103 32 035 | 2/2004 |
| GB | 2 149 469 | 6/1985 |

* cited by examiner

*Primary Examiner* — Dhirubhai Patel
(74) *Attorney, Agent, or Firm* — Michael J. Striker

(57) ABSTRACT

A fastening device for a line, in particular for an electric cable (12) in a motor vehicle, is proposed, the fastening device having a bush (10) which can be locked in a holder (18), at least partially surrounds the line, is made of elastically deformable material and is fastened releaseably in a cutout (16) of the holder (18) by means of a contour (14). According to the invention, the surface of a bush (10), which is injection-moulded from plastic, is of segmented design in order to obtain easier deformability of the bush when fitting it into an associated holder (18).

15 Claims, 2 Drawing Sheets

FASTENING DEVICE FOR A LINE

CROSS-REFERENCE TO RELATED APPLICATION

The invention described and claimed hereinbelow is also described in German Patent Application DE 10 2006 042 663.0 filed on Sep. 12, 2006. This German Patent Application, whose subject matter is incorporated here by reference, provides the basis for a claim of priority of invention under 35 U.S.C. 119(a)-(d).

BACKGROUND OF THE INVENTION

The present invention relates to a fastening device for a line, in particular for an electric cable in a motor vehicle.

DE 43 41 384 C2 describes a feedthrough for lines, which includes elastic grommets which are lockable in place in a carrier and accommodate the line in a sealed manner. The elastic grommets may be slid via their base regions in a fitted manner into recesses which are connected to the edge of the carrier. The recesses for the grommets are radial in design and have a width which corresponds to the diameter of the grommet. A ring which encloses the carrier on the edge is also provided in order to lock the grommets in place in the recesses. The ring secures the grommets in the inserted position. The entire system has a complex design, and inserting the cables with the grommets is time-consuming.

SUMMARY OF THE INVENTION

In contrast, the device according to the present invention having the features of the independent claim has the advantage that the fastening device is greatly simplified in terms of design and installation. The force required to insert the line with the grommet enclosing it may be kept low, since the segmented surface of the grommet contour is relatively easily deformable even when plastic is used to manufacture the grommet.

It is particularly advantageous when the contour of the grommet is designed in the shape of a groove with an irregularly shaped groove base. A grommet of this type may be inserted with minimal force in a suitably sized recess of a holder which is preferably manufactured from a flat sheet-metal or plastic part. The manufacturing costs for this fastening device and the time required for installation are much lower than they are for known systems.

It has proven particularly advantageous when the grommet contour is designed in the shape of a groove with tooth-like raised areas on the groove base. Expediently, the raised areas on the groove base are of equal height, so that the line with the grommet need not be oriented in a certain installation position when it is inserted into a recess in the holder. Individual raised areas on the base of the groove are substantially easier to deform than is a smooth, cylindrical groove base, thereby greatly simplifying the insertion of the grommet.

It has also proven expedient for connecting segments to extend between the raised areas of the contour, which are narrower in design than the raised areas themselves. In this manner it is possible to reduce or completely prevent the play remaining between the grommet and the inner edge of the recesses in the holder without increasing the installation force. This applies in particular when each of the connecting segments has the same height as the adjacent raised areas.

To prevent axial play between the line grommet and the holder, it is also expedient for the groove-shaped contour of the grommet to include at least one irregularly-shaped side wall. In this manner, easily deformable regions are created on the sides of the contour; these regions also reduce or eliminate the axial play of the grommet in the recess of the holder in which the grommet is situated, without increasing the installation force.

A particularly advantageous embodiment of the fastening device according to the present invention is obtained when the grommet is manufactured using an easily deformable plastic and is applied to the line—in particular to an electric cable in a motor vehicle—via injection using a plastic injection molding process, the grommet being preferably composed of polyurethane (PUR), in particular a polyether-based polyurethane. Although a material of this type has a greater Shore hardness than do rubber materials, given the proposed design of the contour of the grommet, the installation force may be limited to acceptably low values with minimal play, thereby making it possible to utilize the cost advantages of a design of this type as compared with a grommet which is subsequently slid onto the line, without making assembly more difficult and without reducing the accurate fit between the grommet and the assigned holder. The PUR material used for the plastic coating which is applied via injection molding preferably has a Shore hardness of 50 A to 100 A, in particular 60 A to 80 A. Its elasticity is therefore not substantially greater than that of rubber materials and, due to the manner in which it is processed, costs and assembly effort may be greatly reduced.

Further advantageous embodiments of the present invention are presented in the dependent claims and are described in greater detail in the description that follows.

BRIEF DESCRIPTION OF THE DRAWING

An embodiment of the present invention is presented in the drawing and is described in greater detail in the description below.

DESCRIPTION OF THE PREFERRED EMBODIMENTS

Figure 1:
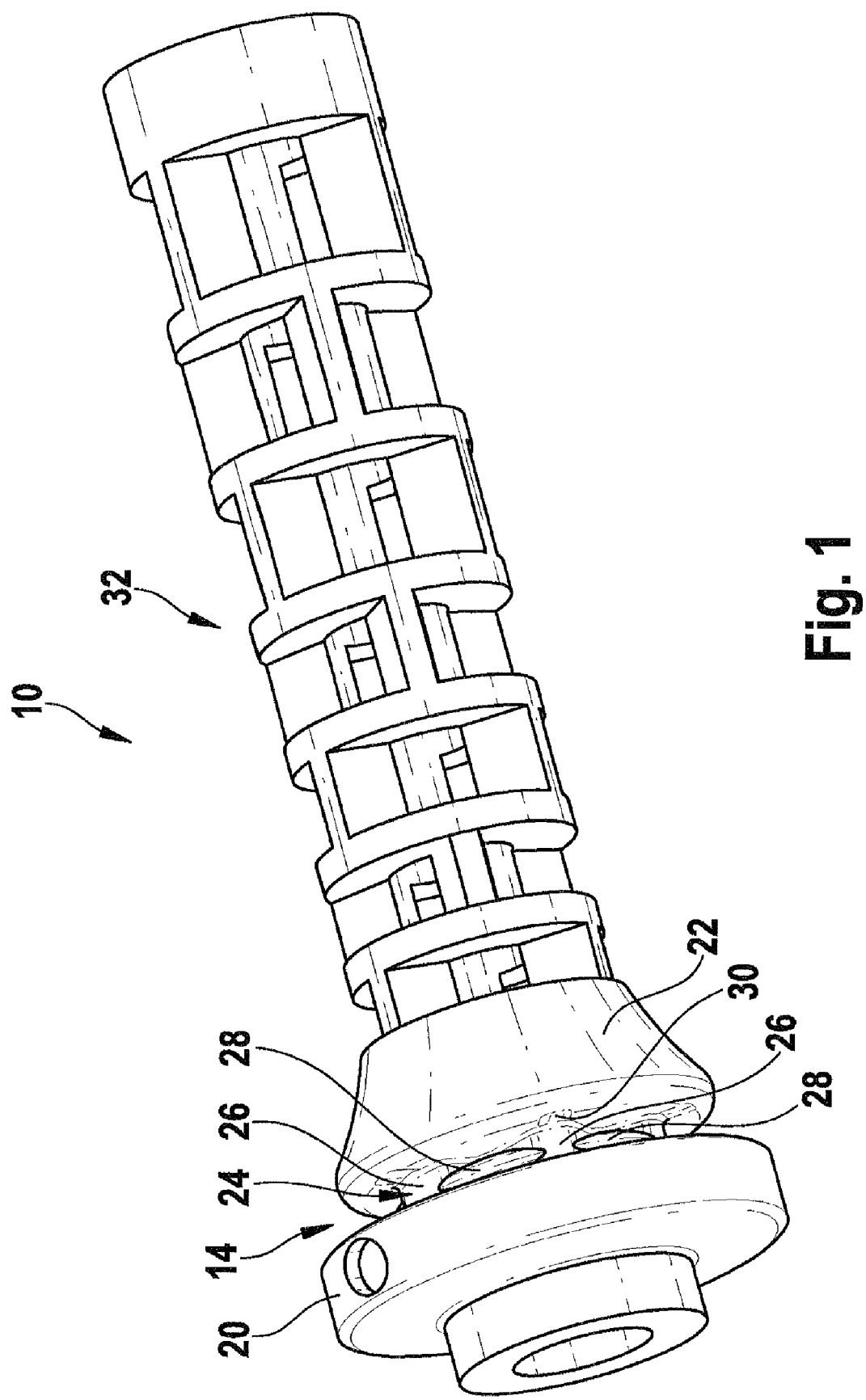
FIG. 1 is a perspective illustration of a fastening grommet to be installed on a line.

FIG. 1 shows a grommet 10 of a fastening device for a line, in particular for an electric cable 12 in a motor vehicle, which is composed of plastic and is applied directly to the cable using a plastic injection molding process. A particularly suitable plastic material for grommet 10 is polyurethane, preferably polyether-based polyurethane, with a Shore hardness of 60 A to 80 A. A grommet 10 of this type which has been applied via injection molding bonds at the surface with the insulation of cable 12 when it is applied via injection molding, and is thereby situated in a fixed and non-slidable manner in a position on cable 12 which is specified for the particular fastening application. For special applications, grommet 10 may also be produced via injection molding separately from the line or the cable, e.g. using an elastomeric plastic, and it may be subsequently slid onto the cable.

Figure 4:
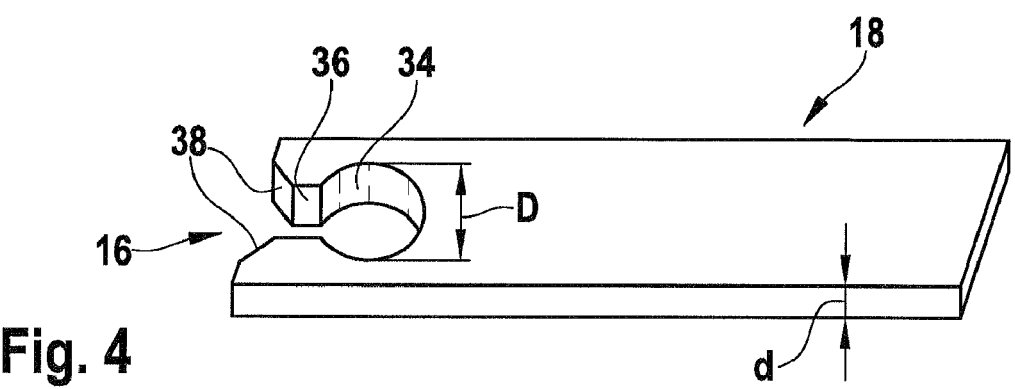
FIG. 4 is a schematicized, perspective depiction of a holder of a fastening device according to the present invention as shown in FIGS. 1 through 3.

Grommet 10 according to FIG. 1 encloses the cable entirely and, after installation, it detachably engages via its groove-shaped contour 14 in a recess 16 of a holder 18, as shown in FIG. 4 and which will be described in greater detail below. The surface of contour 14 of grommet 10 is segmented and bears against the smooth inner surface of recess 16 of holder 18.

Grommet 10 includes, in the region of its locking in holder 18, two flange-shaped ridges 20 and 22 which limit groove-shaped contour 14 and bear, after installation, against the surfaces of holder 18 on either sides of recess 16. Groove base 24 has an irregular design with segments, including a plurality of tooth-like raises areas 26 of equal height. Connecting segments 28 extend between raised areas 26 on groove base 24. Connecting segments 28 are narrower in design than are raised areas 26, but they have the same height as raised areas 26. An essentially homogeneous but easily deformable surface therefore results on groove base 24, which requires only relatively minimal installation force to be inserted in recess 16 of holder 18 and, depending on the magnitude of the specified, permissible installation force, ensures a complete or at least largely play-free radial seat in holder 18.

The design of the surface of groove-shaped contour 14 between ridges 20 and 22 is freely selectable within wide limits. In the embodiment, the wall formed by ridge 20 extends vertically relative to the cable axis, and the wall formed by ridge 22 extends slightly conically; both of the ridge edges are rounded to make them easier to press into recess 16. One side wall of groove-shaped contour 14 is irregular in design with slight recesses 30—which have a shape similar to that of groove base 24—so that the deformation forces are also reduced on at least one side wall of the groove-shaped contour, thereby further reducing the installation forces required for insertion into recess 16, while also ensuring a play-free seat of grommet 10 in recess 16 of holder 18.

To increase the stiffness of the entire system composed of cable 12 and grommet 10 which has been applied via injection molding, a grid-shaped sleeve 32 which is designed as one piece with the remaining pieces of the grommet and which is also fixedly connected to cable 12 via injection molding abuts ridge 22. Sleeve 32 counteracts a bending of cable 12 during assembly. The outer edge of ridge 22 slants downward, and its diameter decreases from the required height of groove-shaped contour 14 to the diameter of sleeve 32, thereby resulting in an even distribution of installation forces on cable 12.

Figure 2:
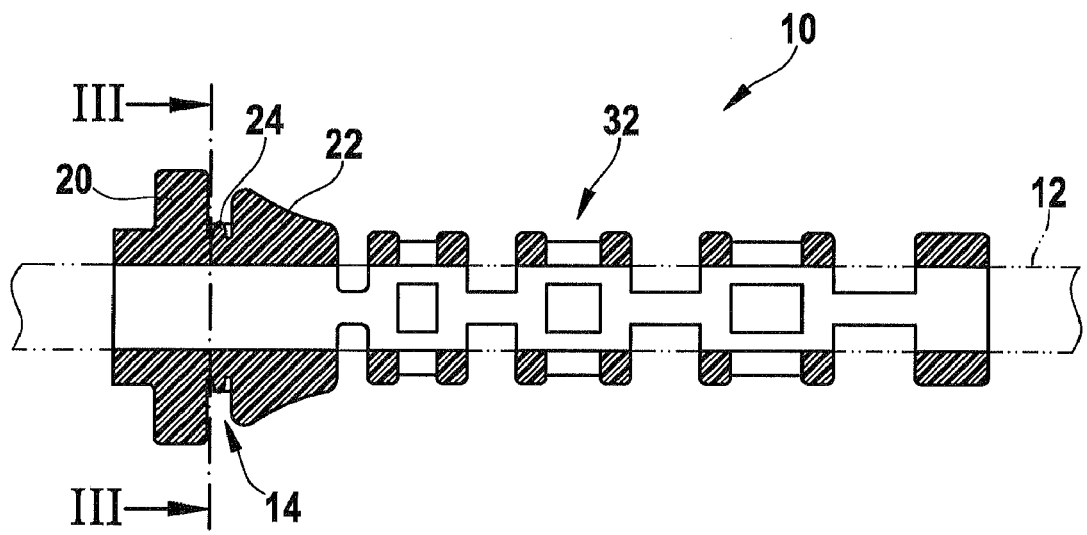
FIG. 2 is a longitudinal sectional view through a grommet according to FIG. 1, which has been applied via injection molding to line.
Figure 3:
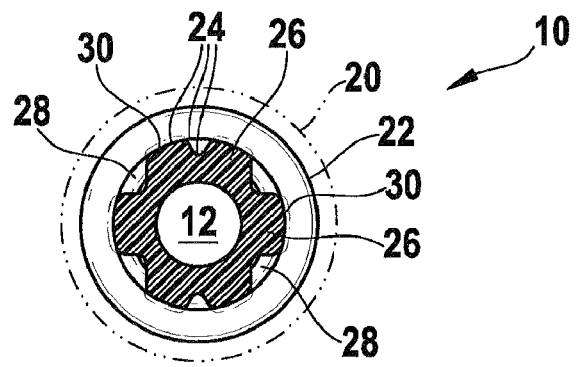
FIG. 3 is a cross-sectional view through the grommet along line III-III in FIG. 2.

FIGS. 2 and 3 show a longitudinal sectional view and a cross section through grommet 10, cable 12 being shown diagrammatically only to illustrate the shape of grommet 10 which has been applied via injection molding. FIG. 2 shows, in particular, the cylindrical shape of ridge 20 and the side wall of ridge 22 which slants slightly toward groove-shaped contour 14, and the rounded outer edges of ridge 20 and 22, which limit the groove-shaped contour toward the outside.

Raised areas 26 on groove base 24 are shown more clearly in FIG. 3. Section III-III in FIG. 2 lies between connecting segments 28 and the inner wall of ridge 20. In contrast to connecting segments 28, tooth-shaped raised areas 26 are cut in the illustration in FIG. 3 and are therefore shown shaded. Components that are the same are labelled with the same reference numerals in FIGS. 1 through 3.

FIG. 4 shows a greatly schematicized view of holder 18 for cable 12 with grommet 10 which is applied via injection molding. The shape of recess 16 and wall thickness d of holder 18 are of particular significance in this case. Diameter D of recess 16 in the receiving region of groove-shaped contour 14 should correspond approximately to the outer diameter at groove base 24, and wall thickness d of holder 18 should correspond approximately to the inner width of groove-shaped contour 14. These dimensions may be varied within certain limits in accordance with the permitted installation force applied when grommet 10 is inserted with cable 12 into recess 16; the installation force is determined by the shape of the individual elements of groove-shaped contour 14 and the elasticity of the plastic used for grommet 10. Recess 16 is essentially composed of a circular receiving opening 34, a constriction 36 which secures the locking of grommet 10 with cable 12 in receiving opening 34, and an installation opening 38 which widens outwardly in a conical shape for grommet 10 with cable 12. Holder 18 is usually punched from a piece of sheet metal, or it is composed of a plastic part, either one having suitable wall thickness d in accordance with the width of groove-shaped contour 14.

Via the design—according to the present invention—of the fastening device it is made possible to replace known grommets which are made of rubber material, are manufactured as individual parts, and are slid onto the line with grommets which are applied via injection molding directly or are slid in place on the lines to be secured, the greater Shore hardness of the plastic material being compensated for by the design according to the present invention, thereby making it advantageously possible to utilize the greater stiffness, lower costs, and fixed seat of the grommet on the line.

What is claimed is:

1. A fastening device for a line, comprising a holder (18) having a recess (16), a grommet (10) which is lockable in the holder (18), at least partially encloses the line, is made of elastically deformable material, and is detachably fastened in the recess (16) of the holder (18) via contour (14), wherein the grommet (10) is injection molded using plastic, and a surface of the contour (14) is segmented, and wherein the contour (14) is designed as a groove with tooth-like raised areas (26) on a groove base (24).

2. The fastening device as recited in claim 1, wherein the groove base (24) is irregularly shaped.

3. The fastening device as recited in claim 1, wherein the groove base (24) includes a plurality of raised areas (26) all having the same height.

4. The fastening device as recited in claim 3, wherein connecting segments (28) extend between the raised areas (26) of the contour (14).

5. The fastening device as recited in claim 4, wherein the connecting segments (28) are narrower than the raised areas (26).

6. The fastening device as recited in claim 4, wherein each of the connecting segments (28) has the same height as the raised areas (26) that are adjacent.

7. The fastening device as recited in claim 1, wherein the contour (14) of the grommet (10) has at least one irregularly (30) shaped side wall.

8. The fastening device as recited in claim 1, wherein the grommet (10) is composed of polyurethane (PUR).

9. The fastening device as recited in claim 8, wherein the grommet (10) is composed of the polyurethane which is polyether-based.

10. The fastening device as recited in claim 1, wherein the material of the grommet has a Shore hardness of 50 A-100 A.

11. The fastening device as recited in claim 10, wherein the material of the grommet has a Shore hardness of 60 A-80 A.

12. The fastening device as recited in claim 1, wherein a diameter of an essentially round receiving opening (34) in the holder (18) for the contour (14) of the grommet (10) is substantially as great as a largest diameter of the contour (14).

13. The fastening device as recited in claim 12, wherein the receiving opening (34) for the grommet (10) is open toward an edge of the holder (18) and has a width in an insertion region (36) which is smaller than a width of the receiving opening (34).

14. The fastening device as recited in claim 1, wherein a thickness (d) of the holder (18) is substantially equal to a width of the contour (14).

15. The fastening device as recited in claim 1, wherein the fastening device is configured for the line formed as an electric cable (12) in a motor vehicle.

* * * * *